United States Patent [19]

Devlin et al.

[11] 4,157,135
[45] Jun. 5, 1979

[54] CLUTCH LOCK-UP MECHANISM

[75] Inventors: Robert E. Devlin, Indianapolis; Frank W. Janneck, Danville, both of Ind.

[73] Assignee: General Motors Corporation, Detroit, Mich.

[21] Appl. No.: 853,178

[22] Filed: Nov. 21, 1977

[51] Int. Cl.² .............. F16D 23/04; F16D 23/10
[52] U.S. Cl. .................. 192/53 B; 192/103 F
[58] Field of Search .................. 192/48.7, 53 B

[56] References Cited

U.S. PATENT DOCUMENTS

| 3,063,529 | 11/1962 | Cook | 192/53 B |
|---|---|---|---|
| 3,161,270 | 12/1964 | Aschauer | 192/53 B |
| 3,580,371 | 5/1971 | Kron et al. | 192/53 B X |
| 3,679,033 | 7/1972 | Wagner | 192/53 B X |

Primary Examiner—Allan D. Herrmann
Attorney, Agent, or Firm—J. C. Evans

[57] ABSTRACT

A clutch assembly for use between a combiner box and a vertical take-off, shaft driven variable pitch lift cruise fan is self contained and is positively engaged and disengaged without spline tooth interference upon pilot demand and wherein means are provided so that no clutch slip occurs following engagement and wherein further means are provided to maintain clutch engagement in the event of oil pressure loss during the engaged mode of operation.

4 Claims, 10 Drawing Figures

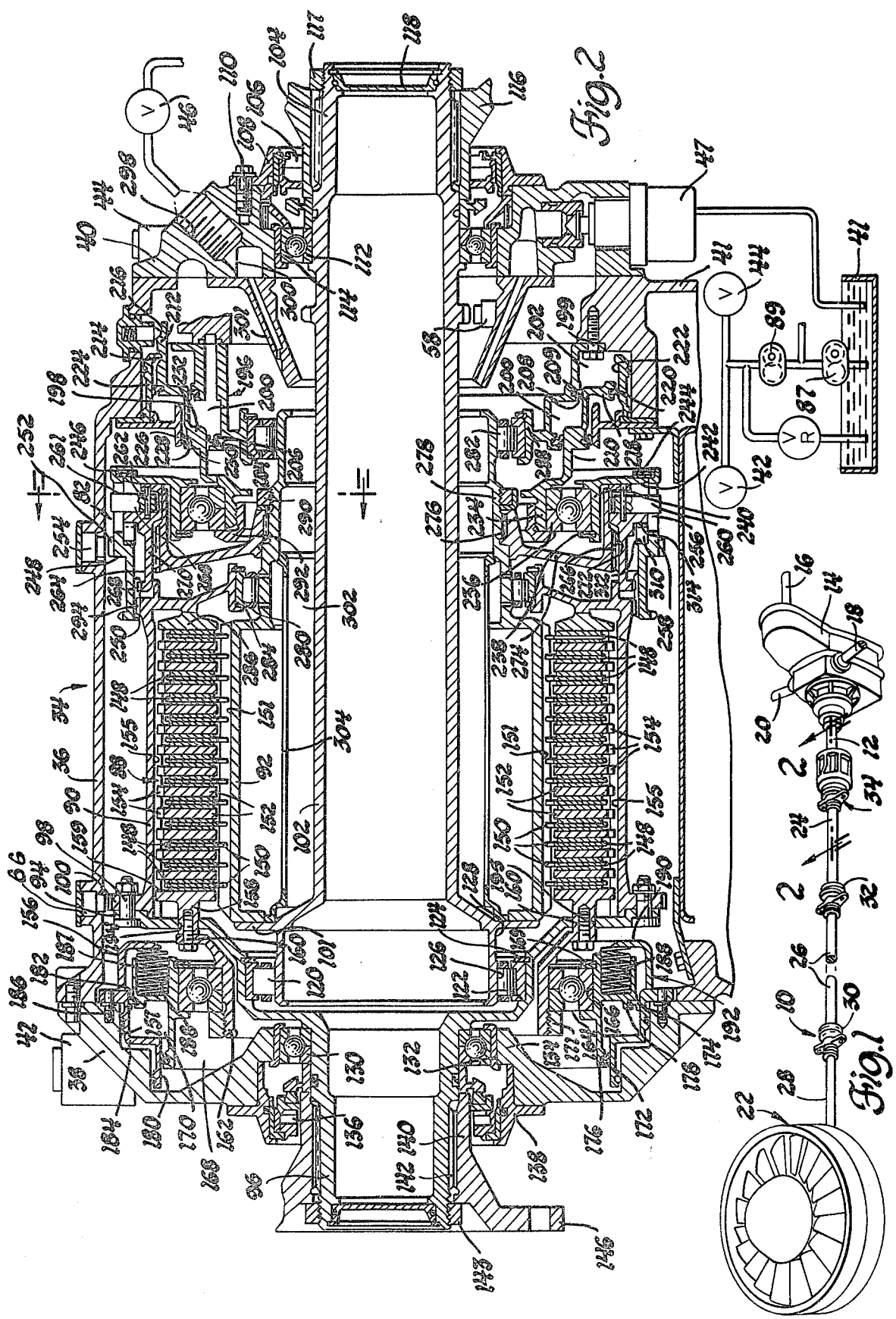

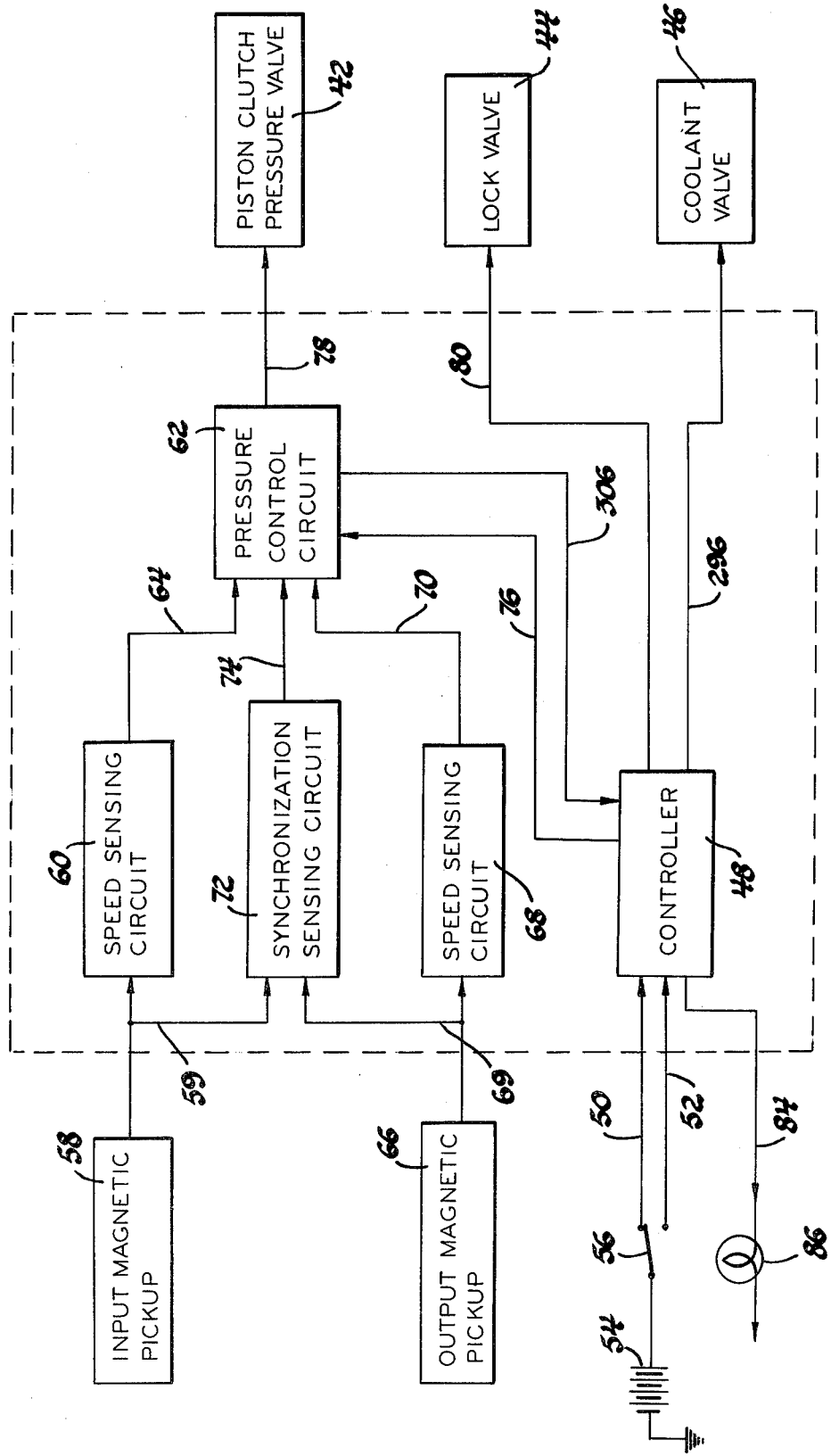

CLUTCH LOCK-UP MECHANISM

The invention herein described was made in the course of work under a contract or subcontract thereunder with the Department of Defense.

This invention relates to disc type clutches and more particularly to disc type clutch for selectively coupling a driven shaft to a propeller load.

Clutch devices for selectively coupling and decoupling a propeller to a gas turbine engine output shaft have been proposed which include a first and second plurality of stacked friction plates connected to clutch input and output members respectively. A hydraulically operated piston exerts a clamp up pressure on the friction plates to affect rotation of an output shaft in response to input shaft operation until the input and output shaft are at synchronous speed and thereafter a splined coupling is interconnected to positively couple the input and output clutch members. One such arrangement is set forth in U.S. Pat. No. 3,679,033, issued July 25, 1972, to Wagner. In this arrangement, the components are hydraulically actuated and designed for use in a helicopter type aircraft to selectively couple or uncouple a forward thrust propeller to the output of a gas turbine engine.

While the arrangement in the aforesaid U.S. Pat. No. 3,679,033 is suitable for its intended purpose, it is incorporated as part of an existing shaft and gear assembly for a gas turbine engine driven helicopter lift rotor and tail rotor.

An object of the present invention therefore is to provide an improved hydraulically operated clutch assembly that is self contained and wherein means are provided so that no clutch slip is produced after engagement of the clutch to transfer power from an input shaft to an output shaft and wherein the means provided to eliminate clutch slip includes an improved clutch lock mechanism having a first plurality of spline teeth on an input, a second plurality of spline teeth on an output and an intermediate lock member that is biased between the input and output spline teeth by an axial spring and maintained in circumferential contact with the first plurality of teeth by means of a torsional spring effect and wherein the intermediate member has spline teeth thereon and configured so that a predetermined backlash is formed to permit relative circumferential and axial motion between the intermediate spline member and the input and the output shaft spline teeth to compensate for input and output tooth misalignment at synchronous speed of operation between the input and output drive of the assembly.

Yet another object of the present invention is to provide an improved clutch assembly between a combiner box and a forward or nose fan unit for use in vertical take off aircraft and wherein the clutch is a self contained unit operable to transmit in excess of 11,000 HP at full fan drive speed and includes friction drive discs therein operated by a hydraulic piston control into an engagement phase of operation and wherein means are provided to pressurize the lock piston upon synchronous speed of operation. The clutch lock mechanism includes a plurality of spline teeth on an input, a plurality of spline teeth on an output and an intermediate clutch lock spline member having a spring biasing it axially with respect to the input and output spline teeth and wherein means including a flyweight directs torsional force on the intermediate spline member to bias it in a direction to maintain the intermediate spline member against the input spline teeth, the inermediate spline member and spline teeth on said input and output having a blacklash formed therebetween to permit relative circumferential motion between the intermediate spline member and the input and output spline teeth to compensate for circumferential spline tooth misalignment between the spline teeth of the input and output.

Yet another object of the present invention is to provide an improved disc type clutch assembly having a self-contained housing in surrounding relationship to operating components of the clutch assembly to be located directly within a drive line between a combiner gear box and a variable pitch lift fan unit and including means to permit selected drive of the lift fan during a vertical flight mode of aircraft operation and including an outer clutch member and inner clutch member connected respectively to output and input shaft components and each have clutch friction plates secured thereto in stacked, interleaved relationship; and wherein a hydraulically operated piston is operable to pressure the clutch plates together in accordance with operation of a clutch engage valve operated on pilot demand and wherein oil admitted to the clutch piston is modulated to limit the clutch energy to one horsepower per square inch of clutch plate area; and wherein means are provided to sense the synchronous operation of the input and output shafts and operable at synchronous speed to operate a clutch lock mechanism including a second hydraulically operated piston that moves an intermediate splined, lock member into a lock position between spline teeth on input and output components; the assembly including an axial bias spring and a speed responsive flyweight that direct a torsional and axial spring effect on the intermediate member; the spline teeth on both the input and output components being helical in configuration and the splines on the lock member being helical.

Still another object of the present invention is to improve a clutch assembly of the type set forth in the preceding object wherein the splines on the input and output are helical in configuration and have an angle such that the axially deflected travel of the intermediate lock member permits it to rotate at least one circular pitch to permit axial shifting movement thereof during a lock step to insure positive engagement of the intermediate lock member with a clutch outer member regardless of the circumferential position of clutch outer member spline teeth with respect to the intermediate member as it is moved from an axially spaced, disconnected position into an interlocked position during the lock mode of clutch operation.

Further objects and advantages of the present invention will be apparent from the following description, reference being had to the accompanying drawings wherein a preferred embodiment of the present invention is clearly shown.

FIG. 1 is a view in perspective of a mechanical drive for a lift fan including the clutch of the present invention;

FIG. 2 is an enlarged, longitudinal sectional view taken along the line 2—2 of FIG. 1 looking in the direction of the arrows with a diagrammatically shown hydraulic circuit;

FIG. 10 is a diagrammatic view of a control system for the clutch unit of FIG. 1.

Figure 3:
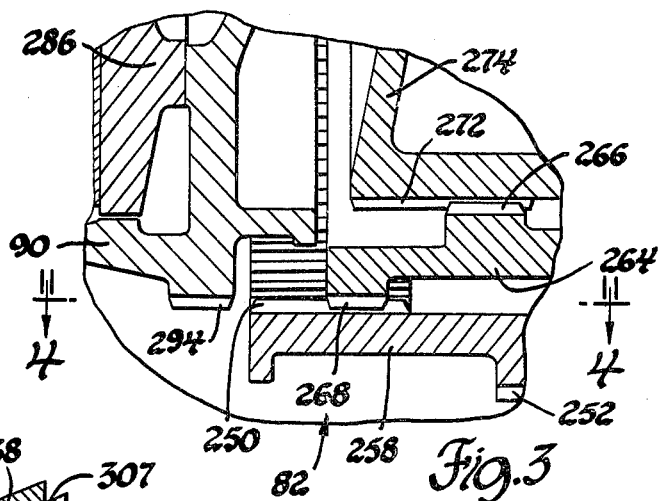
FIG. 3 is an enlarged, fragmentary sectional view of mechanical clutch lock components in the present invention.

Referring now to the drawings in FIG. 1, a drive system 10 is illustrated including an input shaft 12 adapted to be connected to the output from a combiner gear box 14 having an input shaft 16 thereto adapted to be connected to a gas turbine engine (not shown). The combiner gear box 14 includes side output shafts 18, 20 that are directed laterally therefrom to interconnect main power propulsion units for power transfer thereto from the gear box.

Such a mechanical drive system is suitable for use in lift cruise type propulsion systems wherein the main propulsion engines are operated during a forward thrust phase of operation and power transfer can be directed therefrom to an auxiliary variable pitch propeller type lift fan unit 22. More particularly, in the illustrated arrangement the lift fan unit 22 is connected by a plurality of shaft segments 24, 26 and 28 and interconnected couplings 30, 32 to transfer power from the gear box under control of a self-contained, light weight clutch unit 34.

The lift fan unit 22 may, for example, be a front located fan unit operable during vertical take off and landing modes of an aircraft. In such arrangements, power is supplied from the combiner gear box and directed through the clutch unit 34 to operate the fan during such modes at pilot demand. The clutch unit 34 is operable to disconnect the fan unit 22 from the combiner gear box 14 during conventional flight modes of operation where the main propulsion engines are used to drive the aircraft.

In accordance with certain principles, the clutch unit 34 includes an outer case 36 having end plates 38, 40 and a sump housing 41 thereon to define a modular assembly that has unusual compactness and is adapted for an in-line drive train configuration of the type set forth in FIG. 1. The clutch unit 34 is operable to transmit up to 11,000 HP at fan drive speeds of between 8,000 and 10,000 RPM.

Referring to FIG. 2 the clutch unit 34 is under the control of a clutch pressure valve 42 mounted on the end plate 38. It is also under the control of a lock valve 44 mounted on end plate 40 of the outer casing. The system also includes a coolant control valve 46 connected to the end plate 40 and a coolant relief valve 47 for directing coolant back to sump 41.

In accordance with certain principles of the present invention these valves are under the control of a control circuit 48 having a pair of input terminals connected respectively to an engage input signal line 50 and a disengage input signal line 52 selectively connected to a power source 54 by a pilot operated single pole, double throw switch 56. Additionally, the control system includes an input magnetic pickup 58 on casing 36 for sensing the clutch input speed and directing it via line 59 to a first speed sensing circuit 60 from whence a signal is directed to a pressure control circuit 62 via an input speed signal line 64. An output magnetic pickup 66 on casing 36 is connected to a second speed sensing circuit 68 that directs an output speed signal via line 69 to the pressure control circuit via an output speed signal line 70. The input and output speed signals generated by the magnetic pickups 58, 66, respectively, also are directed to a synchronization sensing circuit 72 having an output signal line 74 therefrom directed to the pressure control 62 to direct a signal thereto upon synchronization of input and output speeds. A signal from the controller 48 is directed through line 76 when the switch 56 is in its engage position. When the input and output speeds are out of synchronization and the engage signal is directed to the pressure control circuit 62, an energization signal is directed from line 78 of the pressure control circuit output to the clutch pressure valve 42 to condition it to initiate a clutch energization sequence of operation to be discussed. The controller 48 can direct an output signal through line 80 to a lock valve 44 to operate a clutch lock assembly 82 located internally of the casing 36. Details of the clutch lock assembly 82 are more particularly shown in FIGS. 3 through FIGS. 8 to be described.

The control circuit 48 further includes an output signal line 84 that energizes a fan locked signal light 86 when the clutch has been engaged.

The aforesaid control circuit is shown in diagrammatic form and is merely representative of a system for directing hydraulic pressure from a high volume pump 87 and lower volume pump 89 to the coolant valve 46, the clutch pressure valve 42 and lock valve 44 for operating internal component parts of the clutch unit 34. Preferably the pumps 87, 89 are in a self-contained hydraulic system within unit 34. Circuit components in the block diagrams form no part of the present invention and are omitted herefrom for purposes of focusing on the improved novel features of the clutch unit 34 which are the subject of the present invention.

More particularly, the clutch unit 34 includes an internal oil cooled disc type clutch 88 having an outer clutch member 90 and an inner clutch member 92 in the form of telescoped tubular members. The outer clutch member 90 is connected to a radially outwardly directed large diameter open end 94 of an output shaft 96 by a plurality of circumferentially located nut and bolt elements 98 each of which are secured to a radially outwardly directed flange 100 of the outer clutch member 90. The inner clutch member 92 is fixedly secured to an intermediate flange segment 101 formed on the inboard end of a tubular, open ended input shaft 102 that includes a splined outboard end 104 thereon. More particularly, the input shaft 102 is directed through the end plate 40 and sealed with respect thereto by a face type carbon seal assembly 106. The seal assembly 106 is supported by an annular bearing support plate 108 secured to the end plate by a plurality of bolt elements 110. It is located outboard of a bearing assembly 112 for shaft 102 supportingly received within a bearing support bore 114 in the plate 40. The seal bearing assembly is retained in place by a splined couple 116 and retainer ring 117 on the input shaft 102. Shaft plug assembly 118 closes shaft 102.

The opposite end of the input shaft 102 is rotatably supported by a roller bearing assembly 120 that is supportingly received within an internally located circumferentially grooved surface 122 on the radial flange 94 of the output shaft 96. The bearing assembly 120 is held in place by a snap ring 124 seated in a locking groove on the flange 94 and assembly 120 supportingly receives the outer surface 126 of an inboard stub 128 on the shaft 102. The output shaft 96 is supportingly received by a bearing assembly 130 located in a bearing support bore 132 formed in an inboard flared nose 134 of the end plate 39. The bearing assembly 130 is associated with a face type carbon seal assembly 136 supported on the front end of the end plate 38 by means of an annular seal assembly support plate 138. The output flange 140 is connected by means of a splined couple 142 to the outer surface of the shaft 96 and is held in place thereon by means of a shaft ring nut 143.

In the illustrated arrangement, the output flange 140 has a radially outwardly directed flange 146 thereon that is adapted to be connected to ears of one of the couplings 30 as shown in FIG. 1 whereby the output of the clutch unit 34 will be directed to the lift fan unit 22. In the aforesaid arrangement, the inner clutch member 92 is connected to flange 101 and thereby is rotated relative to the outer clutch member 90 and the relative speed therebetween is dependent upon the amount of engagement between a first plurality of axially spaced friction clutch plates 148 that have a plurality of radially inwardly located fastener tabs 150 fixedly secured to the inner clutch member 92 at axial grooves 151 therein. Interleaved between each of the clutch plates 148 are a second plurality of axially spaced clutch discs 152 having tab ends 154 thereon fixedly secured to the outer clutch member 90 at axial grooves 155 therein. A clutch piston mechanism 156 in cavity 157 of end plate 38 includes a piston pressure applicator 158 with an annular flat face 159 thereon in engagement with the leftmost one of the plurality of spaced clutch discs 148 as best shown in FIG. 2. The piston pressure applicator 158 is connected by means of screw elements 160 to a carriage 162 that is rotatably mounted by means of a bearing assembly 164 in a bearing bore 166 of a hydraulic piston 168. A split retainer ring 169 holds bearing assembly in place at its outer race. At its inner race retention is by a threaded ring 171 on carriage 162. A pressurizable chamber 170 in communication with the outlet of valve 42 is sealed at opposite ends thereof by means of annular seals 172, 174 supportingly received within an outboard grooved end 176 and intermediate grooved wall 178 of the piston 148. The seals 172, 174 are slidably sealingly located for reciprocation with respect to step bores 180, 182 formed on a stepped cylinder 184 that is press fit within the cavity 157 and is secured therein by means of fasteners in the form of screw elements 186, one of which is shown in FIG. 2. The piston 168 is biased to the left as shown in FIG. 2 by a plurality of return springs 187 that are located in inboard recesses 188 of the piston 178 so that the spring 187 is biased between it and a radially inwardly dependent flange 190 of a retainer 192 for the cylinder 184.

Each applicator 158 has a stem 194 directed through an opening 195 in a radially outwardly inboard end of carriage 162 so that operation of mechanism 156 will shift bearing assembly 164 axially of plate 38 and carriage 162 axially of the clutch 88.

At the opposite end of the clutch unit 34, at a point inboard of the end plate 40 is located a rotatably supported, pressure operated actuator 196. It includes a cylinder element 198 connected to casing 36 by screws 199. Element 198 has stepped annular recesses 200, 202 therein and inboard end 204 that supportingly receives a first annular seal element 206 and an intermediate wall portion 208 that receives an annular sealing element 209. The annular seal elements 206 and 209 are axially spaced from one another and slidably sealingly engaged with a reciprocable stepped piston 210. The piston 210 includes an outboard end extension 212 with a detent 214 at one end thereof and a locating shoulder 216 at the outboard end thereof. The piston 210 further includes an annular flange 218 thereon which supportingly receives an annular seal element 220 that is located in sealing relationship with a bore 222 of a cylinder insert 224. A second cylinder insert 226 defines a bore 228 that sealingly supports an annular wiper seal 230 that is supported in an intermediate radial wall 232 of the lock piston 210 for sliding reciprocating motion with respect to the bore 228. An inboard extension 234 on the lock piston 210 supportingly receives a bearing assembly 236 held by means of an annular split retainer ring 238 at its outer race to an annular bracket element 240 that has a radial outward flange 242 thereon locked by means of a split retainer ring 244 that is fixedly secured within a grooved end 246 of an intermediate lock member 248 of the clutch lock mechanism 82. The intermediate lock member 248 includes a plurality of internally formed splined teeth 250 thereon having the following characteristics:

| HELICAL SPLINE DATA/TEETH 250 FILLET ROOT SIDE FIT, CLASS 5 | |
|---|---|
| NO. OF TEETH | 136 ON BASIS OF 272 |
| PITCH NORM | 32/64 |
| PRESSURE ANGLE NORM | 30° |
| HELIX ANGLE | 16.400000° (LH) |
| LEAD | 94.5788 |
| BASE CIRCLE DIAMETER | 7.591657 REF |
| MINOR DIAMETER | 8.829–8.832 INCHES |
| FORM DIAMETER | 8.860498 INCHES |
| PITCH DIAMETER | 8.909 INCHES |
| MAJOR DIAMETER | 8.945 INCHES MAX |
| FILLET/RAD | .012 INCHES MIN |
| TOOTH TIP BREAK | .005 INCHES MAX |
| PLANE OF ROTATION DATA | |
| DIAMETRAL PITCH | 30.698047/64 |
| PRESSURE ANGLE | 31.041068° |

Figure 6:
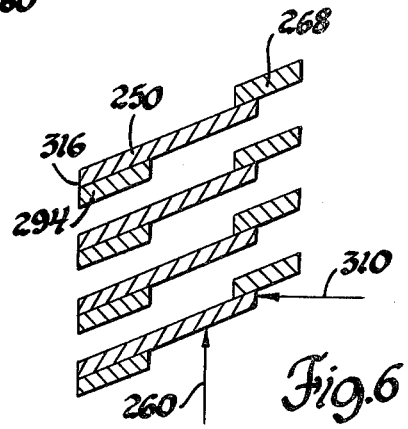

A plurality of radially outwardly directed pick-up teeth 252 are located on the intermediate lock member 248 out of alignment with a magnetic pickup unit 254 on casing 36 and senses lock engage when the intermediate lock 248 is in a locked position as shown in solid line in FIG. 6.

Figure 9:
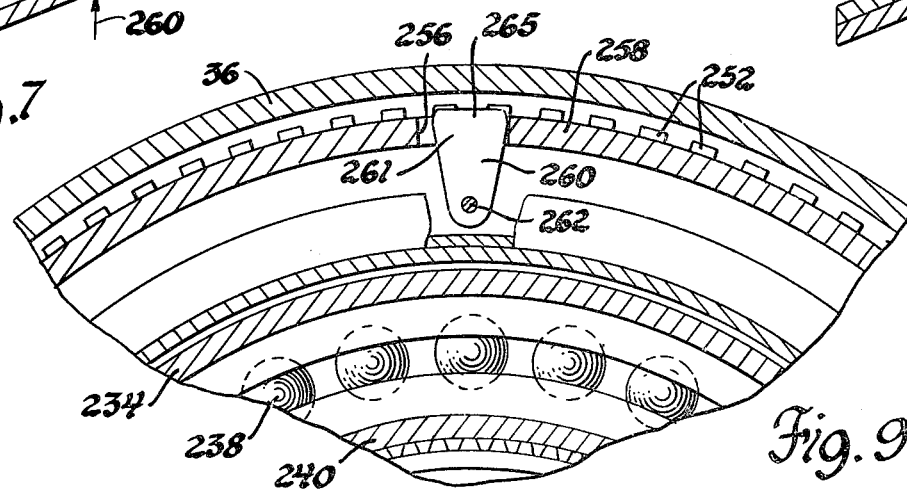
FIG. 9 is a vertical sectional view taken along the line 9—9 of FIG. 2.

A plurality of circumferentially spaced generally rectangularly shaped holes 256, located diametrically opposite one another, are formed in an annular segment 258 of the intermediate lock plate 248. A speed responsive, pivoted, flyweight 260 is located in each hole 256. One of the flyweights 260 is more particularly shown in FIG. 9 as including a pivoted end connected by a pin 262 to a groove within an aft lock member 264. The flyweight 260 is generally triangularly configured mass as viewed from its aft surface 261 and it has an enlarged end 265 thereon that is located in the hole 256 to provide a direct, centrifugally maintained, contact between the aft lock member 264 and the intermediate lock member 248 during a fan engaged operating mode to be discussed.

The aft lock member 264 more particularly includes a pair of sets of axially spaced coupling spline teeth 266, 268. The teeth 268 are located in the inboard end of the aft lock member 264 and include the following characteristics and mesh continuously with the teeth 250 on the intermediate coupling member 248.

| HELICAL SPLINE DATA/TEETH 268 FILLET ROOT SIDE FIT, CLASS 5 | |
| --- | --- |
| NO. OF TEETH | 136 ON BASIS OF 272 |
| PITCH-NORM | 32/64 |
| PRESSURE ANGLE - NORM | 30° |
| HELIX ANGLE | 16.400000 INCHES (LH) |
| LEAD | 94.5788 |
| BASE CIRCLE DIAMETER | 7.591657 INCHES REF. |
| MINOR DIAMETER | 8.769 INCHES MIN |
| FORM DIAMETER | 8.812 INCHES |
| PITCH DIAMETER | 8.860498 INCHES |
| MAJOR DIAMETER | 8.892-8.889 INCHES |
| FILLET/RAD | .009 INCHES MIN |
| TOOTH TIP BREAK | .005 INCHES MAX |
| PLANE OF ROTATION DATA | |
| DIAMETRAL PITCH | 30.698047/64 |
| PRESSURE ANGLE | 31.041068° |

The spline teeth 266 are located on an intermediate, radially inwardly directed flange 270 thereof. The teeth 266 drivingly mate with a plurality of spline teeth 272 formed on an inner lock member 274 which is connected by means of a spline couple 276 to the aft shaft extension 278 of the inner clutch member 92. The aft shaft extension 278 is rotatably supported by spaced bearing assemblies 280, 282. The bearing assembly 280 is supportingly received in a bearing pocket 284 on a fixed annular abutment 286 that is connected to and extends radially inwardly of the outer clutch member 90. The bearing assembly 282 is supportingly received in a bearing support flange 288 located radially inwardly of the cylinder 198.

A threaded retainer ring 290 is threadably received on the shaft extension 278 to secure the inner lock member 274 thereon. A nut 292 is threadably received on the inboard extension 234 for fastening the bearing 236 in place thereon.

As best seen in FIGS. 4 through 8, the number of teeth and pitch angle of the teeth 250 on the intermediate lock member 248 and the number of teeth and the helix angle of spline teeth 294 on the outer clutch member 90, and backlash are selected to permit relative motion between the intermediate lock member 248 and the outer clutch member 90 to assure smooth transition from a disengage position as shown in solid lines in FIG. 3 to an engage position therebetween at clutch lockup.

To accomplish this purpose, the spline teeth 294 have the following described characteristics:

| HELICAL SPLINE DATA/TEETH | |
| --- | --- |
| NO. OF TEETH | 136 ON BASIS OF 272 |
| PITCH-NORM | 32/64 |
| PRESSURE ANGLE NORM | 30° |
| HELIX ANGLE | 16.400000° (LH) |
| LEAD | 94.5788 |
| BASE CIRCLE DIAMETER | 7.591657 INCHES REF |
| MINOR DIAMETER | 8.769 INCHES MIN |
| FORM DIAMETER | 8.812 INCHES |
| PITCH DIAMETER | 8.860498 INCHES BASIC |
| MAJOR DIAMETER | 8.892-8.889 |
| FILLET/RAD | .009 INCHES MIN |
| TOOTH TIP BREAK | .005 INCHES MAX |
| PLANE OF ROTATION DATA | |
| DIAMETRAL PITCH | 30.698047/64 |
| PRESSURE ANGLE | 31.041068° |

The operation of the aforedescribed device is as follows. When it is desired to operate the lift fan unit 22, the pilot closes the switch 56 to the engaged position thereby directing an engaged signal input to the controller 48. This directs a signal through the line 296 to coolant valve 46 to cause it to open and direct coolant through the clutch plates 148 and clutch disc 152. The coolant circuit is from the cooling valve 46 thence through a passage 298 into a plenum 300 in end plate 40, distributor 301, thence through annulus 302 between the shaft 102 and extension 278. From annulus 302 coolant flows across oil distributor 304 and through plates 148 and the clutch discs 152 to be returned to a sump 41.

Additionally, a signal is directed through the output line 306 from the controller 48 through the pressure control circuit 62 to generate a signal on line 78 to the clutch pressure valve 42 to control the amount of pressurization of the chamber 170 thereby to apply and control clutch pressure for desired programmed acceleration of the clutch 88. As the clutch plates 148 and discs 152 engage with one another, the drive from the input shaft 102 is directed from the inner clutch member 92 through the outer clutch member 90, thence to the output shaft 96 and the lift fan unit 22.

During the clutch engagement cycle, the input magnet pickup 58 and output pickup 66 sense speed between input shaft 102 and output shaft 96 which is produced in response to controlled clutch pressure as generated by the piston 168 forcing the annular flat face 159 of the pressure applicator 158 against the most forward one of the input clutch plates 148 which in turn is pressed against the next adjacent clutch disc 152 that is connected to the output clutch member 90. Such pressure is transferred in sequence from clutch plate to clutch disc between the input and output back to the grounded fixed annular abutment 286 of the outer clutch member 90.

Figure 4:
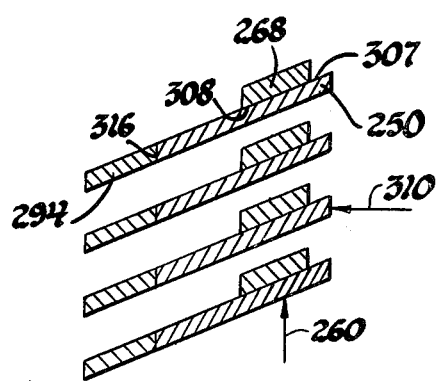
FIG. 4 is a developed view taken along the line 4—4 of FIG. 3 showing the components in a disengaged position.
Figure 5:
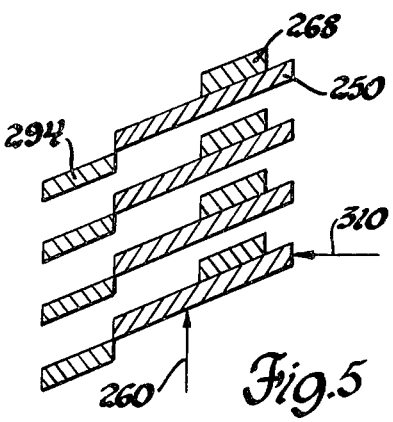
FIGS. 5-8 are views like FIG. 4 showing the component parts in other operative positions.

As soon as synchronization of the input and output are sensed by the input magnetic pickup 58 and output magnetic pickup 66 and fed by the speed sensing circuits 60, 68 to the pressure control circuit 62, a signal is generated through the line 306 to generate a signal through the output line 80 to open the lock valve 44. This causes the clutch unit 34 to switch from a lock disengage mode to a lock engage mode. When oil pressure is directed from the lock valve 44 through passage 306 in casing 36 into the pressurizable chamber 202 to act on the piston 210 to shift it axially to the left as shown in FIG. 2 as the lock mode occurs. Concurrently, the movable components of the clutch lock mechanism 82 are shifted axially to the left. More particularly, this includes the bearing assembly 236 and the annular bracket 240 therefor which pushes against the lock aft member 264. Spring 310 engages clutch lock plate 248 to move it to the left. By virtue of the aforedescribed configuration of the splined teeth 268, 250 and 294 the clutch lock mechanism 82 will produce positive engagement of the input shaft 102 and the output shaft 96. When these components are positioned as shown in FIG. 4 any tendency for end interference between the teeth 250 and 294 upon the axial shifting movement of the component parts of the clutch lock mechanism 82 into an engage position is compensated as follows. As shown in FIG. 4, the side face 307 of each of the teeth 250 is located in engagement with the side face 308 on each of the teeth 268. The flyweights 260 are maintained by inertial force against the side walls of the holes 256 in the plate 258 shown in solid line in FIG. 9 to produce a torsional spring effect on the intermediate lock member 248 to cause it to rotate in a clockwise direction as viewed in FIG. 5. This will align each of the teeth 250 in a fixed circumferential reference with respect to the aft lock member 264. The intermediate lock member 248 is urged into the engage lock position by a wave spring 310 located with an annular space formed between a shoulder 312 on the inside surface of the plate 248 and a flange face 314 on the aft lock member 264.

When teeth 250 and 294 are in alignment during the locking mode, circumferential travel is provided by axial relative motion between splines 268 and 250. The helix angle of each is selected to provide up to one circular pitch. This circumferential motion allows spline 250 to align with a space on spline 294. Spring 310 forces the spline 250 and 294 together.

Spline tooth backlash is selected to provide spline engagement at all random spline positions.

As soon as the clutch lock mechanism 82 is in its engage position as shown in FIG. 4, the teeth 252 of the outer periphery thereof are aligned with the lock position indicator magnetic pickup unit 254 located on the outer case 36. As soon as lock engagement is sensed by the pickup unit 254 a lock signal light is illuminated.

Disengagement of the clutch includes pilot positioning the switch 56 to its disengage position to cause a signal to be imposed on the controller 48 that will direct a signal through the line 196 to condition cooling valve 46 to produce coolant flow between the clutch plates 148 and discs 152. Hydraulic pressure is applied to the unlock chamber 200 and the lock valve 44 is conditioned to remove pressure from the chamber 202. This will cause movable components of the clutch lock mechanism 82 to shift to the right until the teeth 250 disengage from the teeth 294. The disengage action is produced by pull of flange 242 to the right on split ring 244 which will draw intermediate member 248 to the right in FIG. 2. The movement of the mechanism moves the exciter teeth from under the magnetic pickup, thus turning off the clutch lock indicator light. Thereafter clutch pressure is dumped.

While it is desirable to maintain clutch pressure during clutch lock engagement, by virtue of the aforesaid arrangement, loss of hydraulic pressure in the pressurizable chamber 202 of the hydraulic motor 196 and clutch actuating chamber 170 will not result in drive interruption. The helix angles of the splines 150, 268 and 294 are so arranged as to provide positive engagement drive between the input and output shafts.

By way of summary, the improvement of the above-described clutch unit is due in part to the clutch mechanism 82. It features simplicity of few elements including the grounded inner lock member 274, the axially movable, aft lock member 264 and the provision of the axially and circumferentially movable intermediate clutch member 248. The provision of the two springs including the wave spring 310 that applies an axial load on the members 248 and 264 and the flyweight 260 that applies a torsional load on the member 248 condition the parts for smooth engage and disengage. The internal spline teeth 250 on the member 248 and the identical spline teeth 294 and 268 formed on the outer clutch member 90 and the aft lock member 264 respectively produce the lockup of the engage mode because of 136 helical teeth with a spacing therebetween based on 272 teeth. Such teeth spacing plus the helical angle of the spline is selected so that the axial deflected travel of the intermediate member 248 causes it to rotate up to one circular pitch during its axial movement from a disengage to an engage position and vice-versa. This insures a positive engagement of the clutch lock regardless of the circular position of the clutch outer member splines 294 with respect to those spline teeth 250 on the aft lock member 248.

Figure 7:
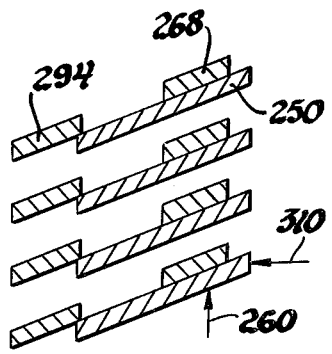
Figure 8:
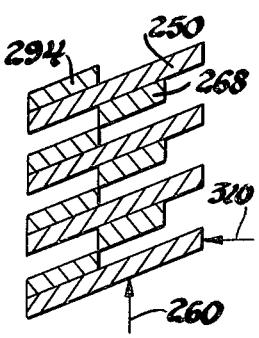

FIG. 7 shows a condition whereby spline 250 is partially engaged with spline 294. As spline 268 moves to the left in an axial direction spline 250 utilizes the backlash (or missing tooth space) deforming flyweight 260 to allow spline 250 to spiral into spline 294 with restriction from spline 268. FIG. 8 shows relative positions of splines at full engagement.

While the embodiments of the present invention, as herein disclosed, constitute a preferred form, it is to be understood that other forms might be adopted.

The embodiments of the invention in which an exclusive property or privilege is claimed are defined as follows:

1. A clutch unit for association with an engine driven propeller assembly to control power transfer from the engine to the propeller assembly comprising: a drive input from the engine, a drive output to the propeller assembly, clutch means coupled to said drive input and said drive output having a disengage position and an engage position to produce clutch slip upon initial power transfer from said drive input to said drive output to accelerate the drive output to a speed synchronized with that of said drive input, means including a clutch piston valve for selectively positioning said clutch means in its engage and disengage positions, means for sensing synchronous drive between said drive input and said drive output as produced following initial clutch energization, first and second spline rings connected respectively to said drive input and said drive output, means including an intermediate spline member carried by said first spline ring and axially movable with respect to said second spline ring to lock the drive input to said drive output to thereby unload said clutch means following synchronous speed of operation between the drive input and said drive output, and means for directing a torsional force to said intermediate spline member for maintaining a bias thereon to load the intermediate spline member and first and second spline rings together, said intermediate spline member and second spline ring being axially movable and said first and second spline rings and intermediate spline member being helical and having a backlash formed therebetween to permit relative circumferential motion of the intermediate spline member into an open mesh position with respect to said first spline ring as said second spline ring moves axially toward said first spline ring thereby to compensate for circumferential spline tooth misalignment between the splines on the drive input and the drive output at synchronous speed operation therebetween.

2. A clutch unit for association with an engine driven propeller assembly to control power transfer from the engine to the propeller assembly comprising: a drive input from the engine, a drive output to the propeller assembly, clutch means coupled to said drive input and said drive output having a disengage position and an engage position to produce a clutch slip upon initial power transfer from said drive input to said drive output to accelerate the drive output to a speed synchronized with that of said drive input, means including a clutch piston valve for selectively positioning said clutch means in its engage and disengage positions, means for sensing synchronous drive between said drive input and said drive output as produced following initial clutch energization, a first spline ring connected to said drive output, clutch lock means including an aft lock member drivingly connected to said drive input having a second spline ring, a rotatable intermediate spline member carried by said second spline ring and axially movable with respect to said first spline ring to lock the drive input to said drive output to thereby unload said clutch means following synchronous speed of operation between the drive input and said drive output, and means including a flyweight on said aft lock member and coupled to said intermediate spline member during rotation thereof for directing a torsional force to said intermediate spline member for maintaining a bias thereon to load the intermediate spline member and first and second spline rings together, said intermediate spline member and second spline ring being axially movable and said first and second spline rings and intermediate spline member being helical and having a backlash formed therebetween to permit relative circumferential motion of the intermediate spline member into an open mesh position with respect to said first spline ring as said second spline ring moves axially toward said first spline ring thereby to compensate for circumferential spline tooth misalignment between splines on the drive input and the drive output at synchronous speed operation therebetween.

3. A clutch unit for association with an engine driven propeller assembly to control power transfer from the engine to the propeller assembly comprising: a drive input from the engine, a drive output to the propeller assembly, clutch means coupled to said drive input and said drive having a disengage position and an engage position to produce clutch slip upon initial power transfer from said drive input to said drive output to accelerate the drive output to a speed synchronized with that of said drive input, means including a clutch piston valve for selectively positioning said clutch means in its engage and disengage positions, means for sensing synchronous drive between said drive input and said drive output as produced following initial clutch energization, an inner lock member secured to said drive input for rotation therewith, an aft lock member having a first spline ring thereon, a second spline ring connected to said drive output, clutch lock means including a rotatable intermediate spline member carried by said first spline ring and axially movable with respect to said second spline ring to lock the drive input to said drive output to thereby unload said clutch means following synchronous speed of operation between the drive input and said drive output, said clutch lock means including a hydraulic actuator having a fixed cylinder means, first bearing means rotatably supporting said drive input on said fixed cylinder means, an axially reciprocating piston in said cylinder means, second bearing means supported by said piston and movable therewith, said second bearing means rotatably supporting said aft lock member for rotation with respect to said axially reciprocating piston whereby said aft member can be axially shifted to lock and unlock said clutch means while transferring torque therethrough, and means for directing a torsional force to said intermediate spline member for maintaining a bias thereon to load the intermediate spline member and first and second spline rings together, said intermediate spline member and second spline ring being axially movable and said first and second spline rings and intermediate spline member being helical and having a backlash formed therebetween to permit relative circumferential motion of the intermediate spline member into an open mesh position with respect to said first spline ring as said second spline ring moves axially toward said first spline ring thereby to compensate for circumferential spline tooth misalignment between the splines on the drive input and the drive output at synchronous speed operation therebetween.

4. A clutch unit for association with an engine driven propeller assembly to control power transfer from the engine to the propeller assembly comprising: a drive input from the engine, a drive output to the propeller assembly, clutch means coupled to said drive input and said drive output having a disengage position and an engage position to produce clutch slip upon initial power transfer from said drive input to said drive output to accelerate the drive output to a speed synchronized with that of said drive input, means including a clutch piston valve for selectively positioning said clutch means in its engage and disengage positions, means for sensing synchronous drive between said drive input and said drive output as produced following initial clutch energization, first spline ring thereon, a second spline ring connected to said drive output, clutch lock means including an intermediate spline member carried by said first spline ring and axially movable with respect to said second spline ring to lock the drive input to said drive output to thereby unload said clutch means following synchronous speed of operation between the drive input and said drive output, said clutch lock means including a hydraulic actuator having a fixed cylinder means, first bearing means rotatably supporting said drive input on said fixed cylinder means, an axially reciprocating piston and said cylinder means, second bearing means supported by said piston and movable therewith, said second bearing means rotatably supporting said aft lock member for rotation with respect to said axially reciprocating piston whereby said aft member can be axially shifted to lock and unlock said clutch means while transferring torque therethrough, and means including a flyweight on said aft lock member and coupled to said intermediate spline member during rotation thereof for directing a torsional force to said intermediate spline member for maintaining a bias thereon to load the intermediate spline member and first and second spline rings together, said intermediate spline member and second spline ring being axially movable and said first and second spline rings and intermediate spline member being helical and having a backlash formed therebetween to permit relative circumferential motion of the intermediate spline member into an open mesh position with respect to said first spline ring as said second spline ring moves axially toward said first spline ring thereby to compensate for circumferential spline tooth misalignment between the splines on the drive input and the drive output at synchronous speed operation therebetween.

* * * * *